United States Patent [19]
Zheng et al.

[11] Patent Number: 5,897,803
[45] Date of Patent: Apr. 27, 1999

[54] OPTICAL FIBER ATTENUATOR MADE BY FUSION SPLICING OFFSET FIBER ENDS WITH EXTENDED HEATING AFTER FUSING

[75] Inventors: Wenxin Zheng, Solna; Ola Hultén, Bromma, both of Sweden

[73] Assignee: Telefonaktiebolaget LM Ericsson, Stockholm, Sweden

[21] Appl. No.: 08/638,146

[22] Filed: Apr. 26, 1996

[30] Foreign Application Priority Data

Apr. 28, 1995 [SE] Sweden ................................. 9501590

[51] Int. Cl.⁶ ........................................................ G02B 6/26
[52] U.S. Cl. ............................ 219/383; 385/96; 385/97; 385/140
[58] Field of Search ........................ 219/383; 385/95–98, 385/140; 65/406, 407

[56] References Cited

U.S. PATENT DOCUMENTS

| | | |
|---|---|---|
| 4,557,556 | 12/1985 | Decker, Jr. . |
| 4,557,557 | 12/1985 | Gleason et al. ............................ 385/96 |
| 5,142,603 | 8/1992 | Forrester .................................... 385/98 |
| 5,285,516 | 2/1994 | Wong ........................................ 385/96 |
| 5,398,296 | 3/1995 | Lin et al. ................................... 385/96 |
| 5,572,313 | 11/1996 | Zheng et al. . |
| 5,588,087 | 12/1996 | Emmons et al. .......................... 385/96 |

FOREIGN PATENT DOCUMENTS

| | | |
|---|---|---|
| 594996 | 5/1994 | European Pat. Off. . |
| 690318 | 1/1996 | European Pat. Off. . |
| 3638861 | 5/1988 | Germany ................................. 385/96 |
| 4236807 | 5/1994 | Germany . |
| 4330774 | 3/1995 | Germany . |
| 53-68250 | 6/1978 | Japan ....................................... 385/96 |
| 53-122434 | 10/1978 | Japan ....................................... 385/96 |
| 60-237408 | 11/1985 | Japan ....................................... 65/407 |
| 61-117508 | 6/1986 | Japan ....................................... 385/96 |
| 4-243201 | 8/1992 | Japan . |
| 6-174961 | 6/1994 | Japan ....................................... 385/96 |
| 7-225324 | 8/1995 | Japan . |
| 2128766 | 5/1985 | United Kingdom . |
| 9313437 | 7/1993 | WIPO . |

OTHER PUBLICATIONS

Benner, A. et al, "Low–Reflectivity In–Line Variable Attenuator Utilizing Optical Fiber Tapers", J. of Lightwave Tech., vol. 8, No. 1, Jan. 1990.

Cork, Michael, "Passive Fiber Optic Components", Short Course Notes, OFC '91, p. 63, Feb. 1991.

Kashima, N., "A New Approach to an Optical Attenuator for a Time Compression Multiplex System Using a Laser Diode as Both Transmitter and Receiver", J. of Lightwave Tech., vol. 9, No. 8, Aug. 1991.

*Primary Examiner*—John A. Jeffery
*Attorney, Agent, or Firm*—Burns, Doane, Swecker & Mathis, L.L.P.

[57] ABSTRACT

Optical fiber attenuators are produced by splicing two fiber ends by melt-fusioning. The fiber ends are initially placed with a large lateral offset and the heating of the spliced portion is continued during a long time period to completely align the fiber ends, in particular the cores (3) and claddings (2) thereof, and to make material of the fibers cores (3) diffuse (23) into the neighbouring regions of the fiber claddings. By properly choosing the extended time for prolonged heating attenuators can be produced with a good repeatability. The prolonged heating period is significantly shortened by the use of a large initial offset.

16 Claims, 8 Drawing Sheets

OPTICAL FIBER ATTENUATOR MADE BY FUSION SPLICING OFFSET FIBER ENDS WITH EXTENDED HEATING AFTER FUSING

TECHNICAL FIELD

The present invention relates to attenuators used for a controlled attenuation of light wave pulses propagating in optical fibers, and in particular to methods and devices for manufacturing them.

BACKGROUND

Optical-fiber attenuators are used for optical signal-power reduction, mainly in short distance telecommunication links or in long distance trunk-lines with signal repeaters having a fixed amplification. In a network, whenever the optical signal power is higher than the dynamic range of the detectors (normally less than 25 dB), the optical signal needs to be lowered by attenuating the signal power to avoid saturation of the detectors.

There are mainly three different types of designs of optical-fiber attenuators: mechanical attenuators, see A. Benner, H. M. Presby. and N. Amitay, "Low-reflection in-line variable attenuator utilizing optical fiber taper," J. of Lightwave Technology, Vol. 8, No. 1, pp. 7–10, January, 1990, laser diode attenuators, see N. Kashima, "A new approach to an optical attenuator for a time compression multiplex system using a laser diode as both transmitter and receiver", J. of Lightwave Technology, Vol. 9, No. 8, pp. 987–990, August, 1991, and fused attenuators, see e.g. M. Cork, "Passive fiber optic components," Short Course Notes, OFC'91, San Diego, p. 63, February, 1991.

Figure 1:
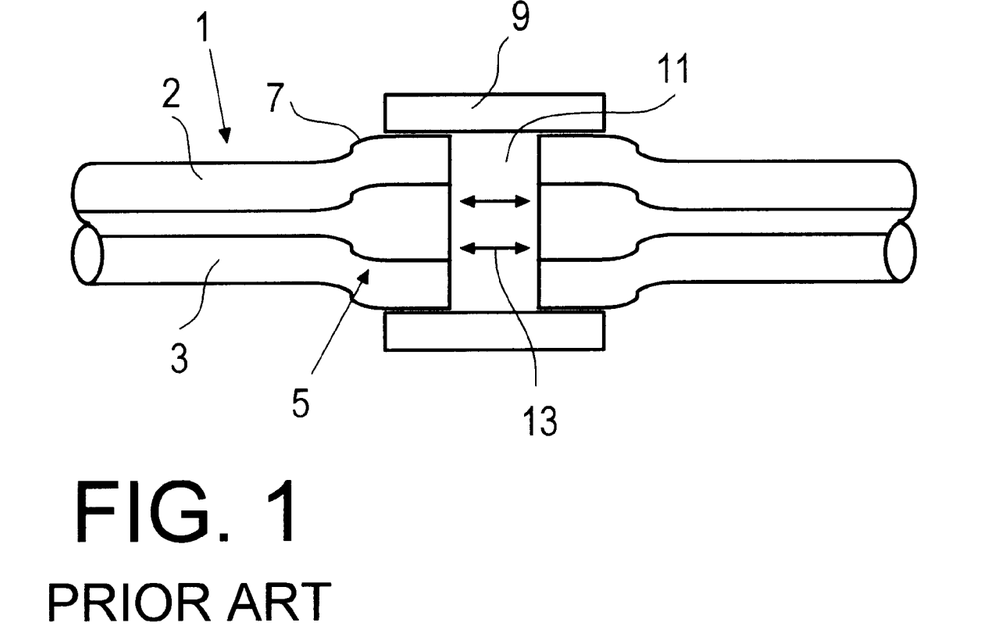
FIG. 1 is a schematic picture of a typical structure of prior art mechanical attenuators.

A typical mechanical attenuator is shown in FIG. 1. Two fiber ends 1 having claddings 2 surrounding cores 3 are made broader at the end surfaces, in the portions 5, producing a taper 7 as seen from the end surfaces. A stabilizing sleeve 9 keeps the ends in place with the end surfaces at some predetermined distance. There are several variations in the design, e.g., with or without the taper 7, the end surfaces may extend perpendicularly or non-per-pendicularly to the longitudinal direction of the fibers, there may be a piece of absorption or half-reflection glass in the air-gap 11, etc. The advantage of a mechanical attenuator is that the attenuation can be adjusted in a mechanical way by moving the end surfaces of the fiber ends, see the arrows 13. However, if the attenuator is to be used as a line build-in component having a fixed attenuation in a system, the variation of attenuation with varying temperature, a high production and maintenance cost, the high reflection—low return loss of about 10–40 dB—will altogether make a system comprising mechanical attenuators very unstable and expensive.

Figure 2:
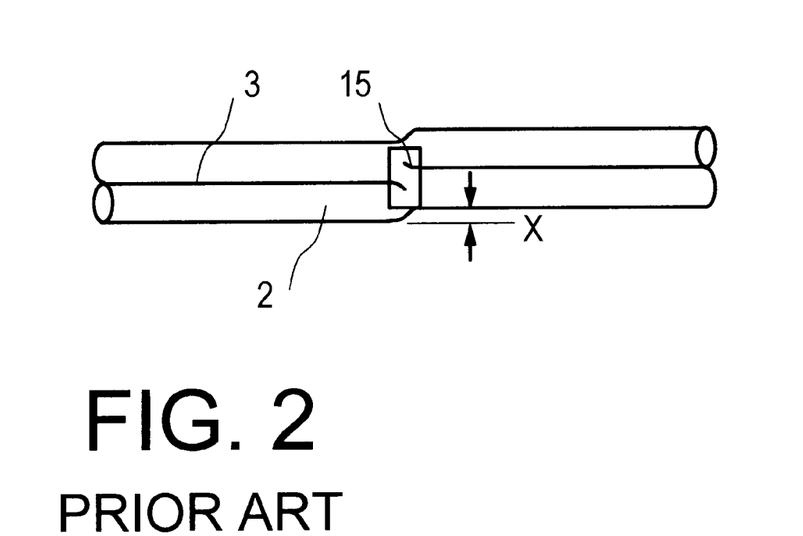
FIG. 2 is a schematic picture of a prior art fused attenuator having cladding and core offsets.

A typical fused attenuator, see FIG. 2 and the article by M. Cork cited above, can be manufactured by offset splicing, as described in the published International patent application WO-A1 95/24665 "Controlled splicing of optical fibers" corresponding to the Japanese patent application 523,400/95 and U.S. patent application Ser. No. 08/400,968, which is incorporated by reference herein. Here the fiber ends 1 are only displaced in a lateral direction, an offset x existing between the sides of the fibers, that is between the outer surfaces of the cladding 2 as seen in a chosen direction. When the splice is made, the surface tension effect will try to align the outer surfaces of the claddings, this also producing a curved end segment 15 of the fiber cores 3 at the formed end surfaces, at the corresponding splice surface. This type of attenuator has a very low production cost, has a very high attenuation stability and reliability, and almost no reflection is obtained from the attenuator. No maintenance is needed. However, the offset of the fiber claddings may not be quite satisfactory, as considered by some system designers. They are worried about the mechanical stress concentration at the splice point when the attenuator is used during extended time periods, especially when the splice is only re-coated without using a protection sleeve. These stress concentrations may lead to unwanted cracks of the fiber claddings or even ruptures of the fiber joints.

The British patent application GB-A 2 128 766 discloses a single mode optical fiber attenuator, wherein the ends of two optical fibers are fused together by applying heat to the ends. When the ends have been satisfactorily fused together the heating is continued. This causes the core region to partially diffuse into the cladding material. When the fiber is then cooled an attenuator is created, i.e. light propagating in the fiber is attenuated as a result of the non-distinctiveness of the fiber cores due to the partial diffusion. The heating can be prolonged during quite a long time. Times of 70 and 150 seconds are mentioned for making attenuators of 4 dB and 8 dB respectively.

In the article "Splice loss of single mode fiber as related to fusion time, temperature, and index profile alteration", by J. T. Krause, W. A. Reed and K. L. Walker, IOOC-ECOC '85, pp. 629–632, the loss or attenuation of a single mode fiber splice is discussed and in particular it is stated that the loss is dependent on the offset of the fiber cores and on the diffusion of the core material. U.S. Pat. No. 4,557,556 for George A. Decker discloses a method for fabricating an optical attenuator wherein the axes of two optical fiber ends are misaligned by an offset distance and then the fiber ends are melted to each other. While the fiber ends are melted, the ends are moved since the surface tension tends to align the exterior sides of the claddings of the optical fibers and then also the axes of the cores will be essentially aligned. The same method is disclosed in German Offenlegungsschrift DE-A1 42 36 807. A similar method is discussed in the European published patent application EP-A2 0 594 996.

SUMMARY OF THE INVENTION

It is an object of the invention to provide an attenuator for use in optical fiber links, which has good aging properties.

It is a further object of the invention to provide a simple method for manufacturing an optical fiber attenuator which can be performed by commercially available automatic splicing machines, the manufacturing process being repeatable and thus producing, for predetermined initial values, attenuators having substantially the same value of the attenuation.

It is a further object of the invention to provide a simple device for manufacturing an optical fiber attenuator which is based on the various means available in conventional automatic splicing machines.

These objects are achieved by the invention, the features and characteristics of which appear from the appended claims.

Thus a fused attenuator is provided which has been tested and found better than mere offset attenuators in many aspects.

By combining both a large initial offset and a prolonged heating attenuators can be produced with a good repeatability and also, the prolonged heating period may not be as long as in the case where only a prolonged heating period used for producing an attenuator element. Typically the time needed for heating when there is an initial offset may be smaller than 20 seconds, e.g. in the range of 15–20 seconds compared to time periods of at least 2 minutes when only diffusion is used. The initial offset can then need to be fairly large, in the magnitude of order of several core diameters, e.g. about 20–50 core diameters.

Thus generally, for producing an optical fiber attenuator from a fiber splice, the following steps are performed. First two ends of optical fibers are prepared for splicing, that is they are cut off to produce substantially flat end surfaces extending perpendicularly to the longitudinal directions of the fiber ends. The end surfaces are placed as for splicing, that is they are positioned adjacent or abutting each other with their longitudinal axes parallel. In this step or before it, the fiber ends are placed with a lateral offset in relation to each other, that is they are placed so that the axes of the cores of the fiber ends and/or the outer surfaces of the claddings of the ends, as viewed in some direction perpendicular to the longitudinal axes of the fiber ends, are offset by an offset distance. Then heat is applied to the abutting, offset ends to cause them to fuse together, and the application of heat is continued after the ends have been fused to cause the core material to partially diffuse into the claddings. The intensity of the heat applied to the fiber ends after the fusioning of the fiber ends together can advantageously be lower than the intensity of heat applied during the fusioning, in the same manner as disclosed in the prior International patent application cited above. The criterion for selecting the length of the time period when heat is continued to be applied is that the claddings of the fiber ends will be substantially aligned, this choice being made also together with a selection of a suitable initial offset distance. An alternative criterion is that the application of heat should be continued so long that the variation of the attenuation of the splice will change very little when the application of heat is prolonged. The offset distance must then be chosen to several core diameters for achieving attenuations of practically used magnitudes, the distance being typically comprised within the range of 10–50 core diameters. The initial offset distance may be calculated in advance and then set to the calculated value, considering the characteristics of the fibers, of the heating process especially considering the temperature of the splice, in order that the finished and cooled fiber splice will have a desired attenuation.

The production of the optical fiber attenuator can be made in a conventional automatic fiber splicing apparatus having a modified control and image processing procedure, the apparatus comprising retaining and positioning means, such as the conventional chucks or clamps having an accurate position control, for retaining two ends of optical fibers and for placing surfaces of the fiber ends at each other in abutting relation as for making a conventional splice, the means being modified to also give the ends a lateral offset which has been calculated in advance. Then there are heating means such as welding electrodes and a high voltage source controlled by some control means for welding the fiber ends, that is applying heat to the abutting ends to cause them to be fused together. The heating means are then also arranged to continue the application of heat after the ends have been fused to cause the core material to partially diffuse into the claddings.

The optical attenuator thus produced will comprise a fusioned or welded splice of two ends of optical fibers, where the material of the fiber cores in the end portions of the fibers, at regions near or adjacent to the splice surface, is partially diffused into the neighbouring regions of the claddings of the fiber ends, this being caused by the prolonged extra heating. Further, by the alignment of the fiber ends from the large initial offset state of the fiber ends, the cores or their remaining parts at the fiber ends will be so heavily curved in the region of the splice that they substantially end at or extend to the exterior surface of the fiber splice.

BRIEF DESCRIPTION OF THE DRAWINGS

The invention will now be described as a nonlimiting embodiment and with reference to the accompanying drawings in which.

DETAILED DESCRIPTION

Figure 3A:
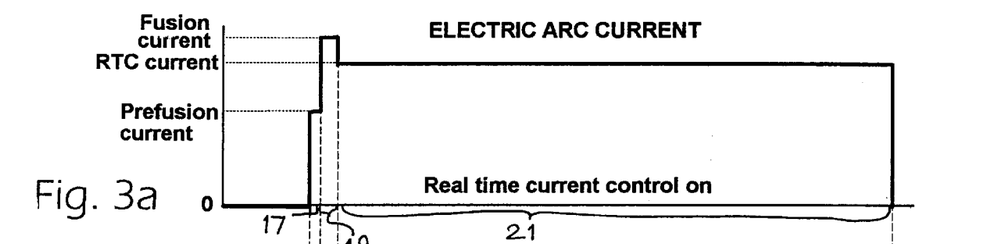
FIGS. 3a, 3b and 3c are diagrams illustrating the relation between fusion time, offset, and attenuation for an offset splice as a function of time.
Figure 3B:
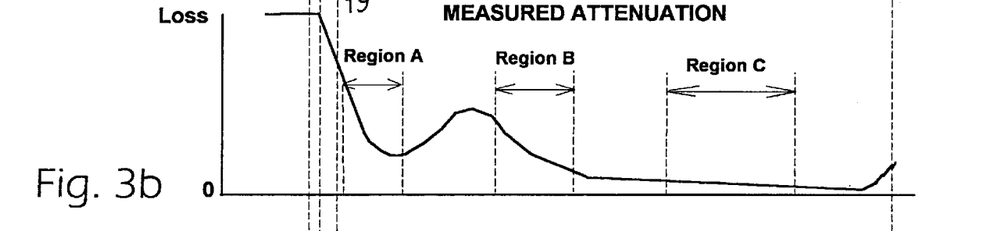
Figure 3C:
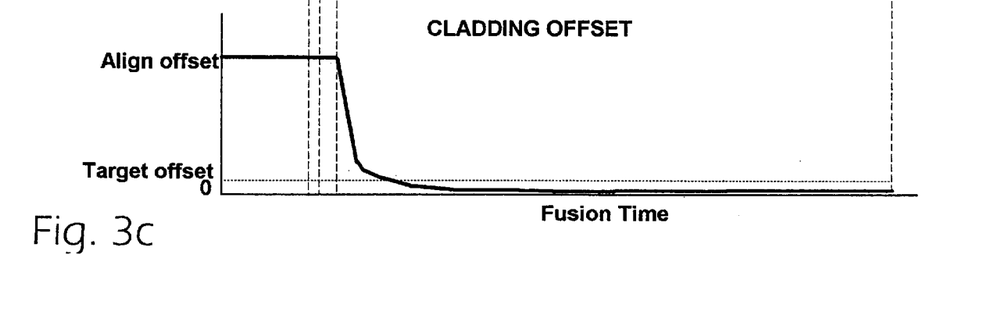

There are different ways of making fusion attenuators. The process when an offset of the claddings of two adjacent fiber ends is initially set and arc fusion starts and continues for quite a long time, about 20 seconds, is illustrated by the diagrams of FIGS. 3a–3c, the fusion process substantially being as disclosed in the prior International patent application cited above comprising an extended time period when the electric current in the electric arc is somewhat smaller than that used during the proper melt-fusioning or welding of the fiber ends. Thus in FIG. 3a a diagram is shown illustrating the used current as a function of time for splicing two ends of standard single-mode optical fibers. During a first short time period 17 a low current is used for prefusion of the fiber ends in order to remove dust. Then, during a somewhat longer time, the proper melt-fusioning is made, with a high current in the electric arc of typically about 13–15 mA during a time period 19. Then, during a long time period 21 a lower welding current is used, which can typically have values which are in the range of 1–2 mA smaller than that used during the fusioning, where the fiber ends are observed continuously and the decreasing cladding offset is monitored.

Figure 4A:
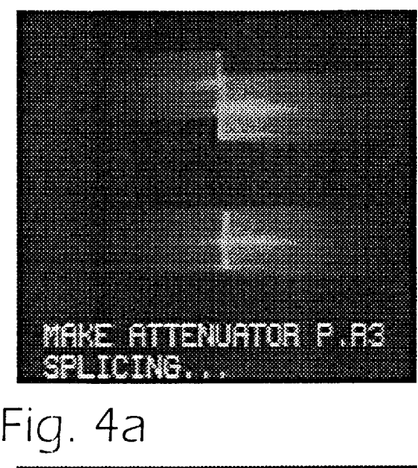
FIGS. 4a–4f are photographs of fiber ends taken during the fusion procedure for making a deformed and diffused attenuator.
Figure 4B:
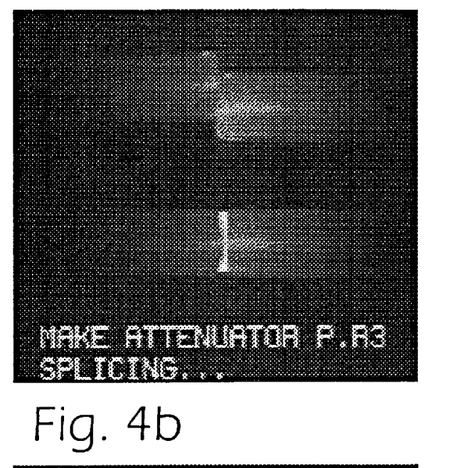
Figure 4C:
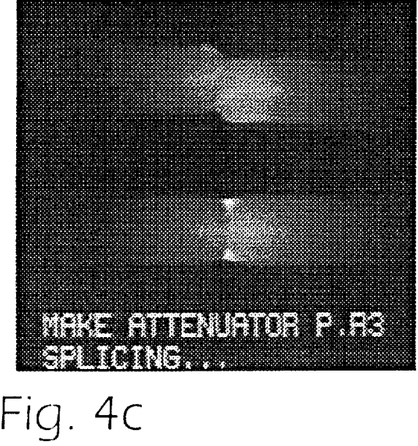
Figure 4D:
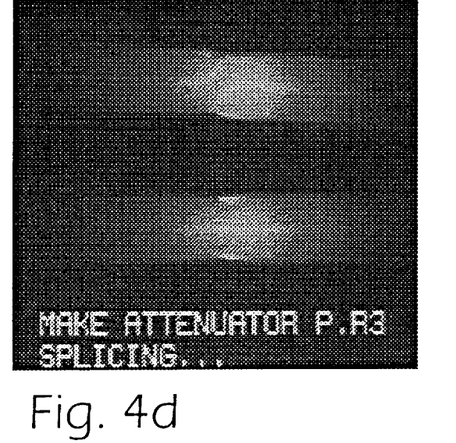
Figure 4E:
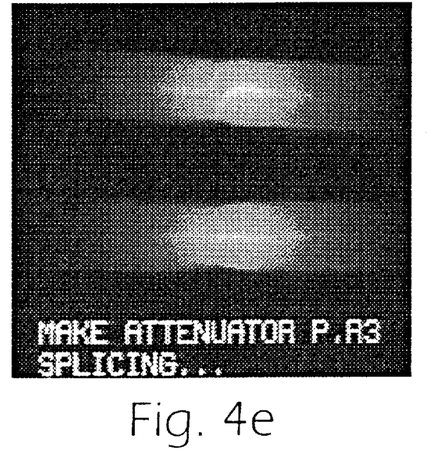

In FIG. 4a–4f photographs are shown which have been taken during the splicing and prolonged heating process. Thus in FIG. 4a a picture is shown of the fiber ends at the time, when the proper fusioning is to start, that is between the time periods 17 and 19. In FIG. 4b a picture is shown of the fiber ends during the fusioning, taken 0.1 second after the picture of FIG. 4a. In FIGS. 4c and 4d two pictures are shown of the fiber splice during the prolonged heating in time period 21, the first one in FIG. 4c at a time 0.7 second after the start of the fusion process and in FIG. 4d 1.5 seconds after the start of the fusioning. In FIG. 4e a picture is shown taken 20.0 seconds after the start. Finally, in FIG. 4f a picture is shown of the fiber splice after the fusioning and heating, when the fiber splice has cooled.

Figure 4F:
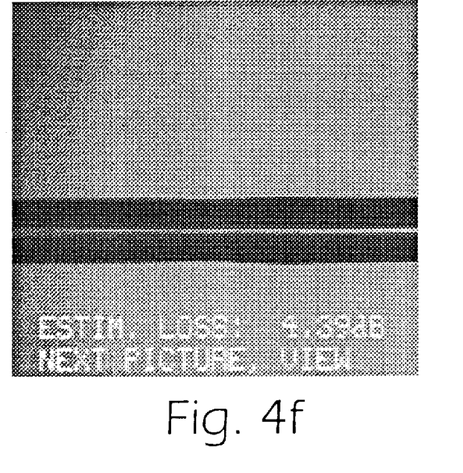

In each of the pictures of FIGS. 4a–4e the fiber ends/splice are/is shown as viewed in two perpendicular directions, from the sides of the fiber ends. The offset of the claddings is made, so that it is only visible in one of the views, the top view. This means that the cladding offset is made in the viewing direction of the bottom views. Thus in FIG. 4b there is, owing to the surface tension, a rounding of the free edges of the cladding at the end surfaces and also a small curve of the cores adjacent to the splice surface. The offset is still quite large. In the pictures of FIGS. 4c and d these effects are more emphasized and the cladding offset decreases. In FIG. 4e there is no offset at all and large curved regions of the cores at the fiber splice surface. In FIG. 4f finally, this effect is also shown, but it may be noticed that here the cores are not visible at all. The light center line in the picture is derived from the lense effect, where the fibers having a cylindrical shape act as cylindrical lenses.

In the diagram of FIG. 3b the measured loss, which is equivalent to the attenuation, in the splice is shown as a function of time. In FIG. 3c the resulting offset of the claddings of the two fiber ends is plotted as a function of time.

As disclosed in the above cited International patent application prior art offset attenuators are obtained in the time period A which follows directly after the melt-fusioning, that is after the time period 19 of FIG. 3a, where a slightly lower arc current is used as compared to the higher arc fusion current. In this time period A, the attenuation in the splice is lowered, when the time of extensive heating is prolonged. Also, the cladding offset decreases substantially linearly with time, at least during the first part of this time period. Photographs of the heated splice in this time region are shown in FIGS. 4c and 4d, where it is seen that there is still a substantial offset of the claddings and that the fiber cores are curved from each other as viewed in one perpendicular direction.

If the intensive heating of the splice is continued, there will be a time period where the attenuation of the splice increases.

It will be due to a further deformation of the fiber cores when the fiber claddings are more and more aligned. Then there is again a regular time period, region B, where the attenuation decreases fairly smoothly when the heating time is continued. Here it can be assumed that fiber cores are more and more regularly deformed. Also here, the offset cladding is small and decreases to near zero.

If then the intensive heating is prolonged even more, the offset cladding is nearly equal to zero and does not change much. The measured attenuation decreases very regularly and linearly, and a time region C can be defined here which is suited for making attenuating splices. Here there is a deformation of the fiber cores and also, the dopant material of the fiber cores is more and more diffused into the surrounding cladding material, the attenuation or loss decreasing linearly with time very accurately.

Comparing the different regions A, B and C, we observe that:

1. The loss or attenuation changing speed, that is the slope of the curve of FIG. 3b, is lowest in the region C. Thus, a better control and stable attenuation can be achieved when making attenuators and stopping the heating in the region C.
2. The attenuation in region C is lower than other regions. Thus, in order to get the same final attenuation in a finished fiber splice or attenuator, the initial offset should be larger than when making attenuators and stopping the intensive heating in the other regions A and B.
3. The cladding offset in region C is almost zero. Thus, there will be no mechanical stress concentrations at the splice point resulting from the discontinuity of the claddings.
4. During the long heating time the dopant of the core diffuses into the cladding in the region C. This diffusion combined with the core deformation dominates the attenuation of a fiber splice in this region.
5. In order to get a good repeatability of the attenuation when making attenuators and stopping the heating in region C, the heating temperature should be well controlled, since the amount of diffusion is strongly dependent on the heating temperature.

Using the real time current control technique, as described in the International patent application cited above, attenuators being both deformed and diffused can be made. This type of attenuators has the following features:

1. No offset or discontinuity is observed in the cladding, in particular in the outer side profile thereof;
2. Almost no reflection of signals propagating through the fiber splice, the return loss>72 dB;
3. No variation of the attenuation for different environment temperatures;
4. A rather small attenuation deviation when manufacturing the spliced attenuators, less than 0.2 dB standard deviation;
5. A low cost of manufacture, the same as for making an ordinary fiber splice;
6. Suited for using both a protection sleeve and re-coating.

Figure 5A:
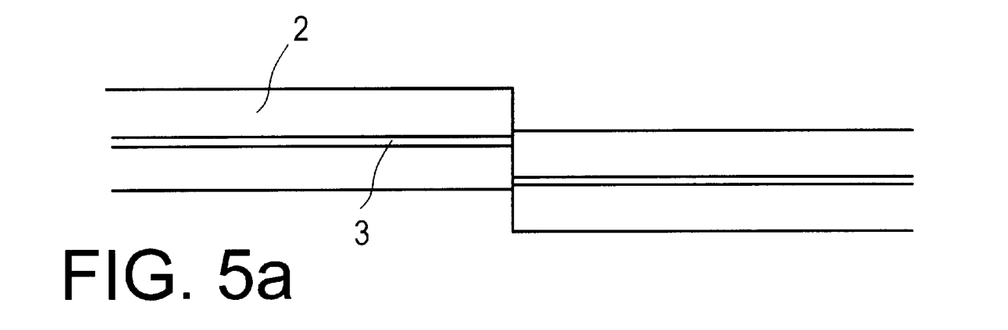
FIG. 5a is a sectional view of two fiber ends in abutting relationship before fusing begins.
Figure 5B:
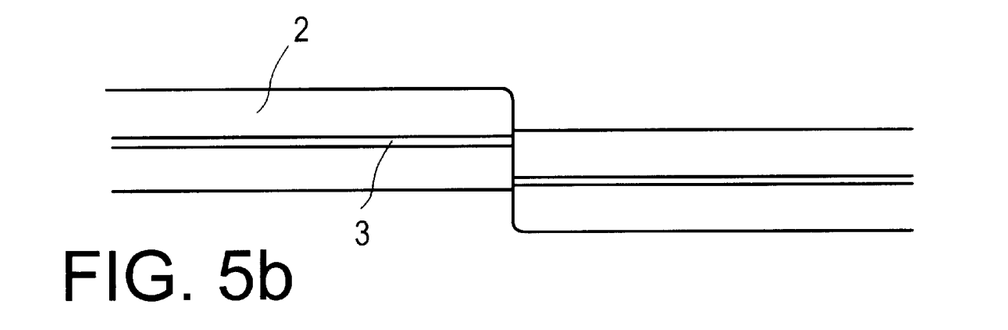
FIG. 5b is a sectional view of the fiber ends of FIG. 5a immediately after fusing.
Figure 5C:
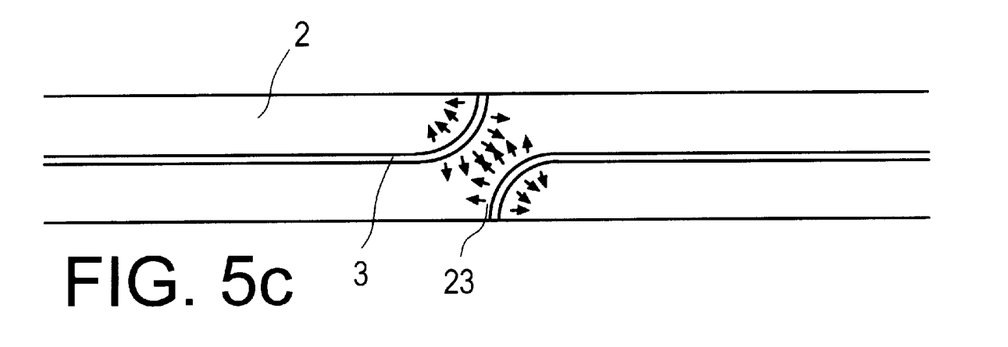
FIG. 5c is a schematic sectional view of a deformed and diffused attenuator formed from the fiber ends of FIG. 5a after fusing followed by prolonged heating.

FIGS. 5a to 5c illustrate the method shown in the photographs of FIGS. 4a–4f in sectional view drawings. In FIG. 5a, two fibers 1a and 1b are shown in axially abutting relationship immediately before fusing begins. As shown the respective cores 3a and 3b and claddings 2a and 2b are relatively offset laterally. FIG. 5b shows the fibers immediately after fusing, in which the free edges of the claddings 2a, 2b have become rounded because of surface tension effects mentioned above. After fusioning and continued heating, which continued heating has been stopped in Region C of FIG. 3b is shown in FIG. 5. It is here seen that fiber cores 3 are strongly curved at the fiber ends to end nearly in a direction perpendicular to the longitudinal direction of the fiber ends and nearly or essentially up to the exterior surface of the spliced fiber. In this curved region also dopant material from the cores 3 has diffused into the surrounding regions of the cladding 2 as indicated by the arrows 23.

Two sets of typical fusion parameters for making the deformed and diffused attenuators are listed in Table 1.

TABLE 1

Fusion parameters for making deformed and diffused attenuators

| Fiber types | AT&T DSF + AT&T DSF | AT&T DSF + Corning DSF |
|---|---|---|
| Offset | 12 μm | 12 μm |
| Length of period 17 (prefusion) | 0.3 s | 0.3 s |
| Prefusion current | 10.5 mA | 10.5 mA |
| Length of period 19 (splicing) | 0.5 s | 0.5 s |
| Splicing current | 15.5 mA | 15.5 mA |
| Length of period 21 (continued heating) | 20.0 s | 20.0 s |
| Current for continued heating | 13.0 mA | 15.0 mA |

Figure 6:
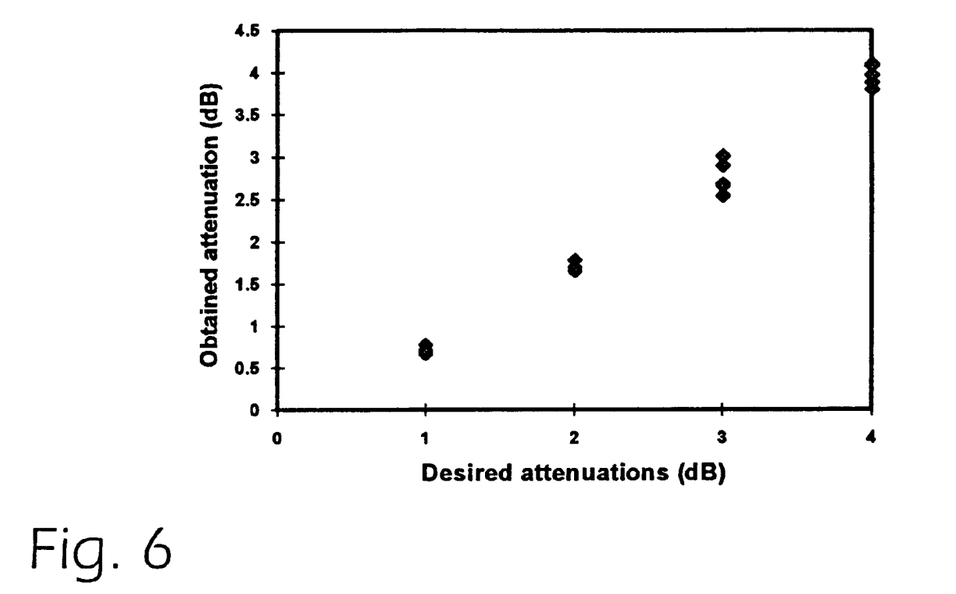
FIG. 6 is a diagram of the measured attenuation for 20 deformed and diffused attenuators made from "AT&T DSF" fibers on both sides of the splice.
Figure 7:
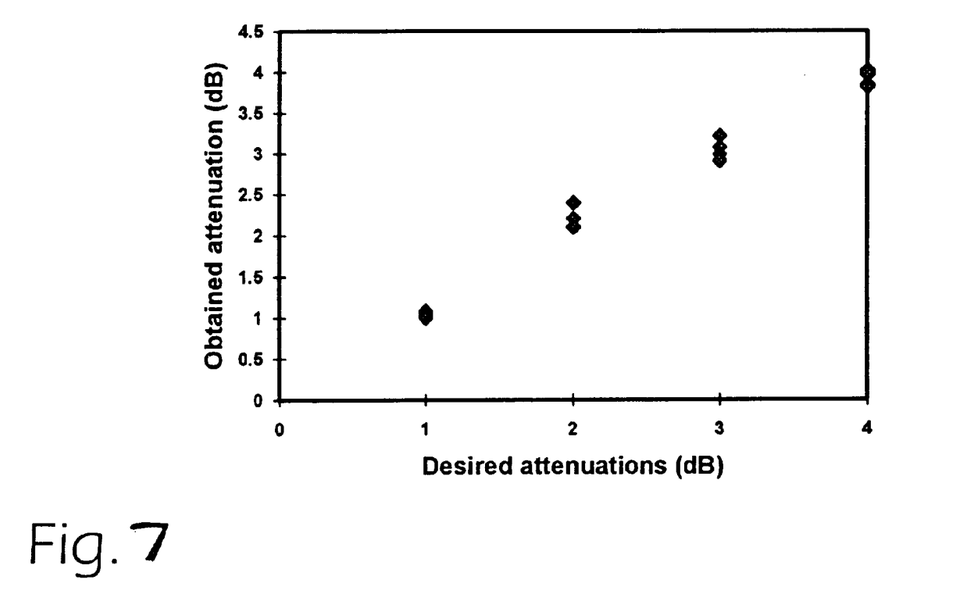
FIG. 7 is a diagram of the measured attenuation for 20 deformed and diffused attenuators made from "AT&T DSF" fibers spliced to "Corning DSF" fibers.

Some measured results are demonstrated in the plots of FIGS. 6 and 7 for deformed and diffused attenuators with two different types of fiber combinations, that is for splices made where the heating has been extended to a suitable time within the time region C, see FIG. 3b. Thus in FIG. 6 the values of the measured attenuation for 20 deformed and diffused attenuators made from optical fibers of type "DSF" as manufactured by AT&T on both sides of the splice are plotted as a function of the desired attenuations of 1, 2, 3 and 4 dB. In FIG. 7 the corresponding values are plotted for 20 deformed and diffused attenuators made from an optical fiber of type "DSF" manufactured by AT&T spliced to an optical fiber of type "DSF" manufactured by Dow Corning.

In Table 2, results from making attenuators are listed, first according to the offset method as described in the International patent application, cited above, and then according to the deformed and diffused method where the heating is prolonged into the time region C of FIG. 3b.

TABLE 2

Comparison between the offset method and the deformed and diffused method for making attenuators

| | Desired attenuation | 1 dB | 2 dB | 3 dB | 4 dB |
|---|---|---|---|---|---|
| Offset Attenuators measured values, in dB | mean (AT&T + AT&T) | 1.146 | 2.092 | 3.123 | 4.119 |
| | STD | 0.102 | 0.095 | 0.209 | 0.208 |
| | mean (AT&T + Corning) | 1.263 | 2.232 | 2.944 | 4.037 |
| | STD | 0.078 | 0.198 | 0.182 | 0.256 |
| | mean return loss (dB) | 64 | 66 | 68 | 69 |
| Deformed and Diffused Attenuators measured values, in dB | mean (AT&T + AT&T) | 0.714 | 1.714 | 2.758 | 3.968 |
| | STD | 0.037 | 0.042 | 0.171 | 0.113 |
| | mean (AT&T + Corning) | 1.040 | 2.186 | 3.022 | 3.930 |
| | STD | 0.030 | 0.114 | 0.117 | 0.080 |
| | mean return loss (db) | >72 | >72 | >72 | >72 |

It is seen here that, although the attenuators when using a long heating period, that is the deformed and diffused attenuators, have measured attenuations differing fairly much from the intended value, the standard deviation (STD) is much smaller for this type of attenuators, compared to those which are only offset and for which the heating is stopped in time Region A of FIG. 3b. Thus the first mentioned method gives attenuators having more similar or constant values of attenuation.

Figure 8:
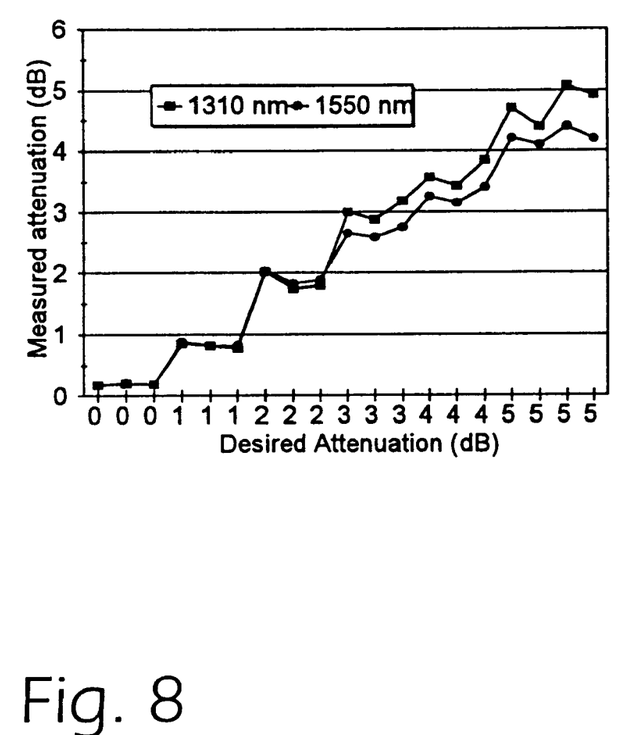
FIG. 8 is a diagram of the measured attenuation for two different wavelengths for deformed attenuators made from fibers "AT&T DSF" spliced to "Corning DSF"
Figure 9:
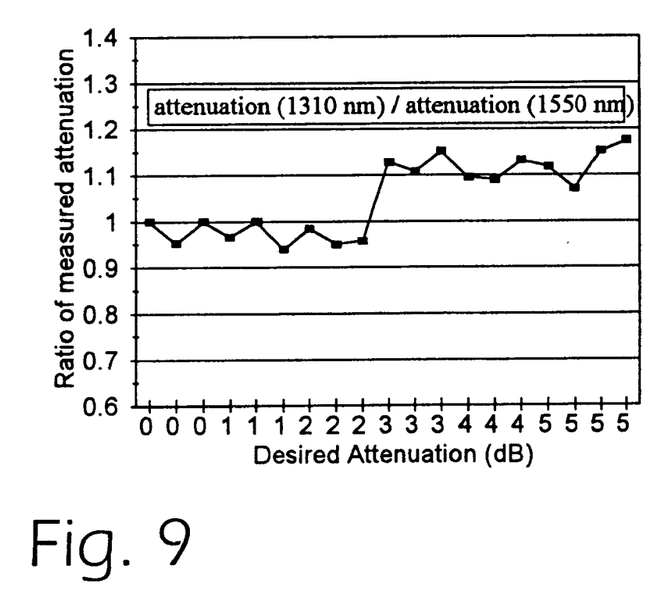
FIG. 9 is a diagram of the ratio of measured attenuation at two different wavelengths.

The wavelength dependency of the deformation attenuator is measured for 19 splices with different attenuations ranging from 0 to 5 dB. Two wavelengths are used for the measurement for each splice. The wavelength dependency can be observed as illustrated by the diagrams of FIGS. 8 and 9. The ratio of the attenuations for the two wavelengths (1310 nm/1550 nm) is about 1.1 when the attenuation is higher than 3 dB.

Figure 10:
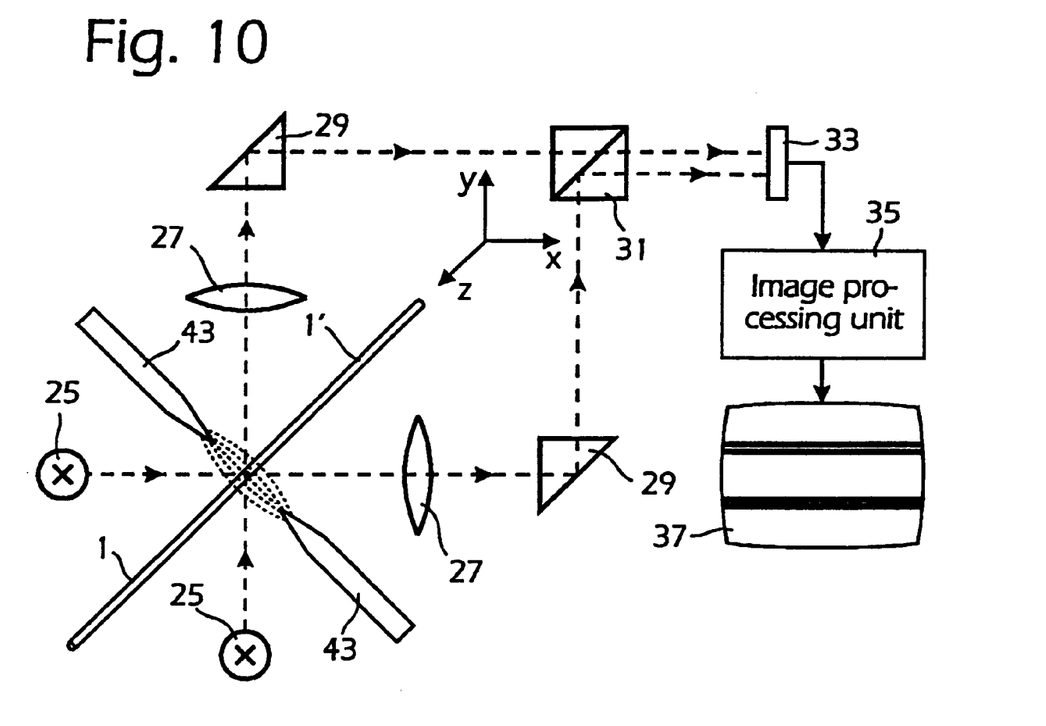
FIG. 10 is a schematic picture of the light paths in an automatic fiber splicing apparatus.
Figure 11:
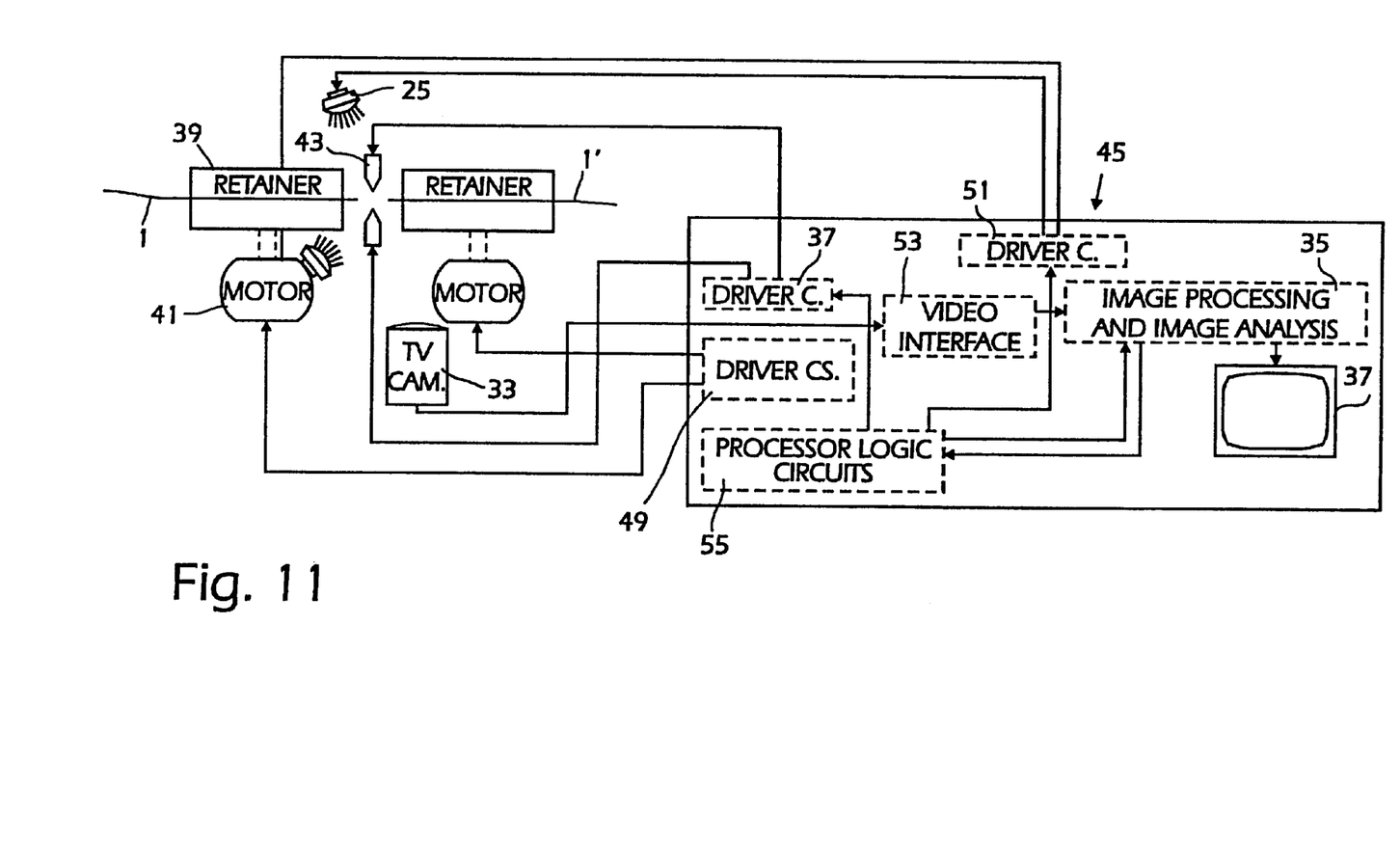
FIG. 11 is a schematic picture of the mechanical and electronic components of an automatic fiber splicing apparatus.

The method described above is advantageously performed by an automatic image processing and positioning device used for splicing optical fibers, the optical components of which are schematically illustrated in FIG. 10 and the mechanical electronic components of which are illustrated in FIG. 11.

In the optical system which is schematically illustrated in FIG. 10 two light sources 25 are arranged which illuminate the splicing position between the two fibers 1 and 1' in two directions perpendicular to each other and also perpendicularly to the longitudinal direction of the fiber ends. The light from the light sources 25 is focused or parallelized by means of lenses 27, after which the light rays are deflected perpendicularly by reflecting elements 29 and is caused to hit a beam splitter 31 which in this case is used invertedly in order to collect the two light beams obtained from the perpendicular directions to the same TV camera or CCD-camera 33 comprising an area or surface having light sensitive elements. From the TV-camera 33 the generated video signal is delivered to an image processing unit 35, by means of which the pictures can be shown on a monitor or display element 37. A picture will then show the splicing position between the fiber ends as viewed in the two perpendicular directions and positioned above each other, compare FIGS. 4a–e.

In the schematic picture of FIG. 11 a fiber splicing device of the automatic type is shown having retainers 39, in which the fiber ends are placed and are retained during the positioning and the splicing. The retainers 39 are movable in three orthogonal coordinate directions both in parallel to the longitudinal direction of the fibers and in two directions perpendicular to this direction which then also are perpendicular to the illuminating direction from the light sources 27. The retainers 39 are thus operated along suitable mechanical guides (not shown) by control motors 41. Electric conducting lines to the electrodes 43 and the motors 41 and the lamps 27 are provided from an electronic circuit module 45 and from driver circuits 47, 49 and 51 respectively. From the TV camera 33 an electric line is arranged to a video interface 53 in the electronic circuit module 45, from which a suitable image signal is delivered to the image processing and image analysis unit 35, compare FIG. 10. The various procedural steps are controlled by a control circuit 55, e.g. in the shape of a suitable micro processor. The control circuit 55 performs the procedural steps mentioned above and thus controls the displacement of the fiber ends in relation to each other by an activation of the motors 41 in suitable displacement directions, provides a signal to the image processing and image analysis unit 35 for starting an analysis of an obtained picture and a determination of the offset, as is observed in the two directions perpendicular to each other. Further, the control circuit 55 controls the activation of the light sources 27 and the time, when a fusion current is to be started by providing electric voltage to the electrodes 43 and the time period during which this high splicing current is to be delivered and also the regulating current for a controlled monitoring of the offset between the exterior surface of the fiber ends by delivering a lower splicing or electrode current.

What is claimed is:

1. A method of making an optical fiber attenuator, comprising the steps of placing two optical fiber ends together in axially abutting relation, applying heat to the axially abutting ends to cause them to fuse together, and continuing the application of heat after the ends have fused to cause the core material to partially diffuse into the cladding, wherein not later than when placing the fiber ends in axially abutting relation and before applying heat to the axially abutting fiber ends the fiber ends are laterally offset by a predetermined offset distance.

2. A method according to claim 1, wherein an amount of heat applied to the fiber ends after the fusioning of the fiber ends together is less than an amount of heat applied during the fusioning step.

3. A method according to claim 1, wherein heat is applied during a time period of sufficient duration so that claddings of the fiber ends are caused to be substantially aligned.

4. A method according to claim 3, wherein at least one of an exterior surface of the fibers and fiber end claddings is aligned.

5. A method according to claim 1, wherein the offset distance is chosen to correspond to several core diameters.

6. A method according to claim 5, wherein the offset distance is selected to correspond to a range of 10–50 core diameters.

7. A method according to claim 1, wherein the offset distance is calculated and set so that the finished and cooled fiber splice has a desired attenuation.

8. A method according to claim 1, wherein application of heat is continued for a time of sufficiently long duration where variation of the attenuation of the splice resulting from application of heat is minimized.

9. A method according to claim 1, wherein the predetermined distance is sufficient to laterally offset at least one of axes of the cores of the fiber ends and exterior surfaces of fiber end claddings.

10. A device for making an optical fiber attenuator, the device comprising:

retaining and positioning means for retaining two ends of optical fiber and for placing surfaces of the fiber ends at each other in axially abutting relation, heating means for applying heat to the axially abutting ends to cause them to fuse together, means for controlling the heating means to continue the application of heat after the ends have been fused to cause the core material to partially diffuse into the cladding, and means for moving the retaining and positioning means before applying heat to the axially abutting fiber ends to laterally displace the fiber ends, so that at least one of the axes of the cores of the fiber ends and the surfaces of the fiber end claddings are offset by an offset distance.

11. A device according to claim 10, comprising means for controlling the heating means to lower the heat applied to the fiber ends after the fusioning of the fiber ends together.

12. A device according to claim 10, comprising means for controlling the heating means to apply heat to a region where the fiber ends are located for a sufficiently long time period so that the claddings of the fiber ends are caused to be substantially aligned.

13. A device according to claim 10, wherein the means for moving the retaining and positioning means is adapted to set an initial offset distance corresponding to several core diameters.

14. A device according to claim 13, wherein the means for moving the retaining and positioning means is adapted to set an initial offset distance in a range corresponding to 10–50 core diameters.

15. A device according to claim 10, comprising means for calculating a sufficient set initial offset distance for moving the retaining and positioning means so that the finished and cooled fiber splice have a desired attenuation.

16. A device according to claim 10, comprising means for controlling the heating means to continue to apply heat for a sufficiently long duration so that variation of attenuation of the splice resulting from the application of heat is a minimum.

* * * * *